United States Patent
Skoro, III et al.

[11] Patent Number: 6,041,226
[45] Date of Patent: Mar. 21, 2000

[54] METHOD AND APPARATUS FOR MONITORING SUBSCRIBER TALK-AROUND USAGE

[75] Inventors: John P. Skoro, III, Plano, Tex.; Brian K. Bunkenburg, Glen Ellyn; Mark L. Shaughnessy, Algonquin, both of Ill.

[73] Assignee: Motorola, Inc., Schaumburg, Ill.

[21] Appl. No.: 08/947,590

[22] Filed: Oct. 9, 1997

[51] Int. Cl.[7] .................................................. H04Q 7/20
[52] U.S. Cl. .......................................... 455/405; 455/406
[58] Field of Search ..................................... 455/405, 406, 455/15, 509, 524, 515

[56] References Cited

U.S. PATENT DOCUMENTS

| | | | |
|---|---|---|---|
| 5,423,055 | 6/1995 | Diaz et al. .................................. | 455/15 |
| 5,771,463 | 6/1998 | Lehmusto et al. ...................... | 455/524 |
| 5,822,682 | 10/1998 | Schroderus et al. ..................... | 455/509 |
| 5,901,342 | 5/1999 | Heiskari et al. ......................... | 455/509 |
| 5,907,794 | 5/1999 | Lehmusto et al. ....................... | 455/509 |

*Primary Examiner*—Daniel S. Hunter
*Assistant Examiner*—Myron K. Wyche
*Attorney, Agent, or Firm*—Christopher P. Moreno; Susan L. Lukasik; Steven R. Santema

[57] ABSTRACT

A method and apparatus for monitoring a subscriber unit's use of a talk-around mode is accomplished when detection of a subscriber unit's selection, and subsequent deselection, of the talk-around mode occurs. Indications of the selection, and subsequent deselection, of the talk-around mode are provided to a monitoring entity (16). The monitoring entity (16) determines the subscriber unit's usage of the talk-around mode based on the indications. From the usage of the talk-around mode, an appropriate fee for such service can be obtained. Alternatively, the monitoring entity may be provided with usage information, which is used to establish the appropriate fee.

19 Claims, 4 Drawing Sheets

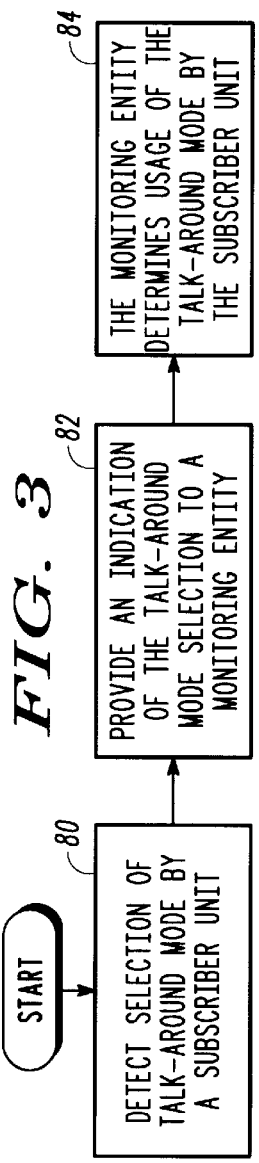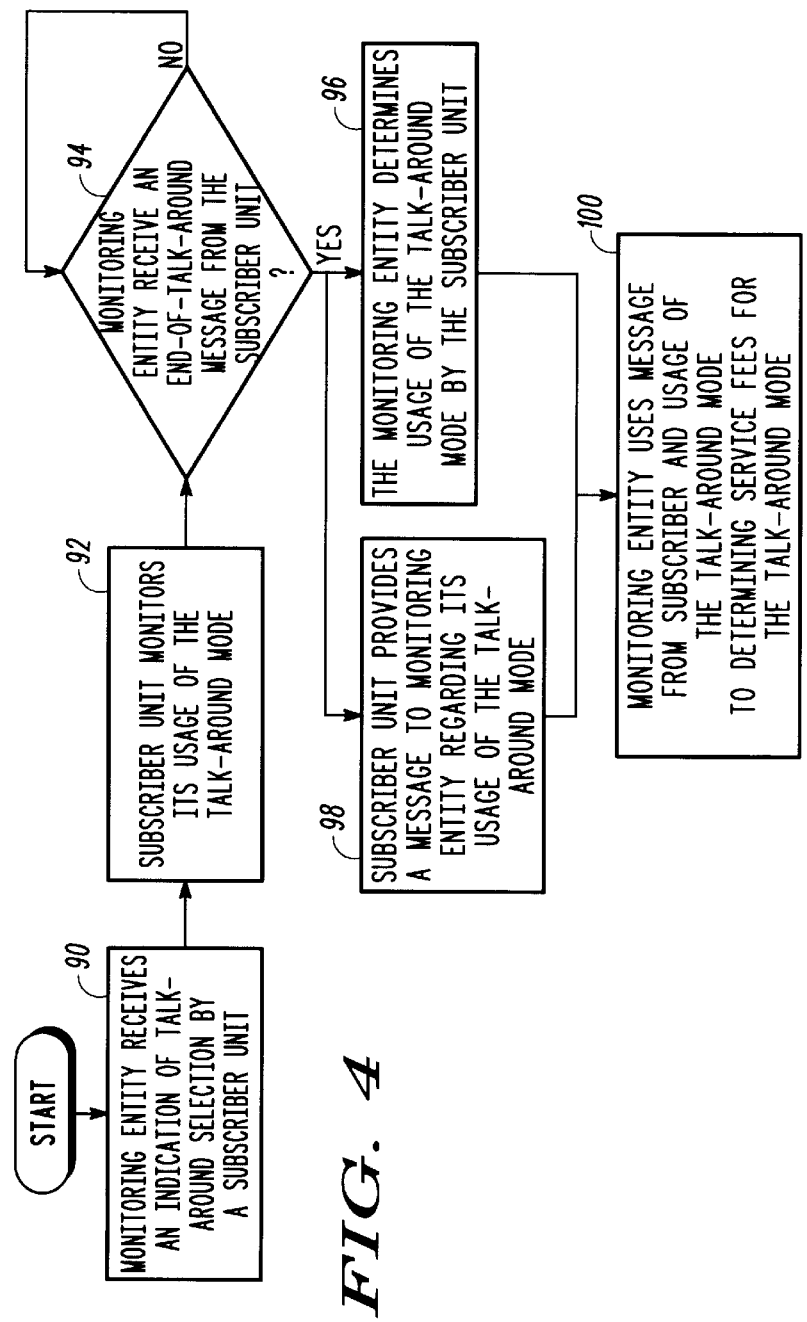

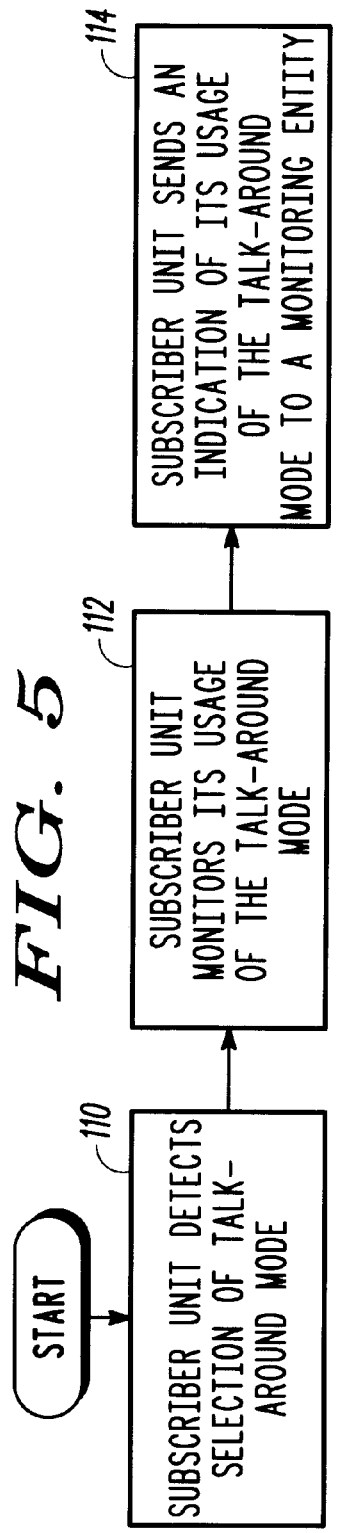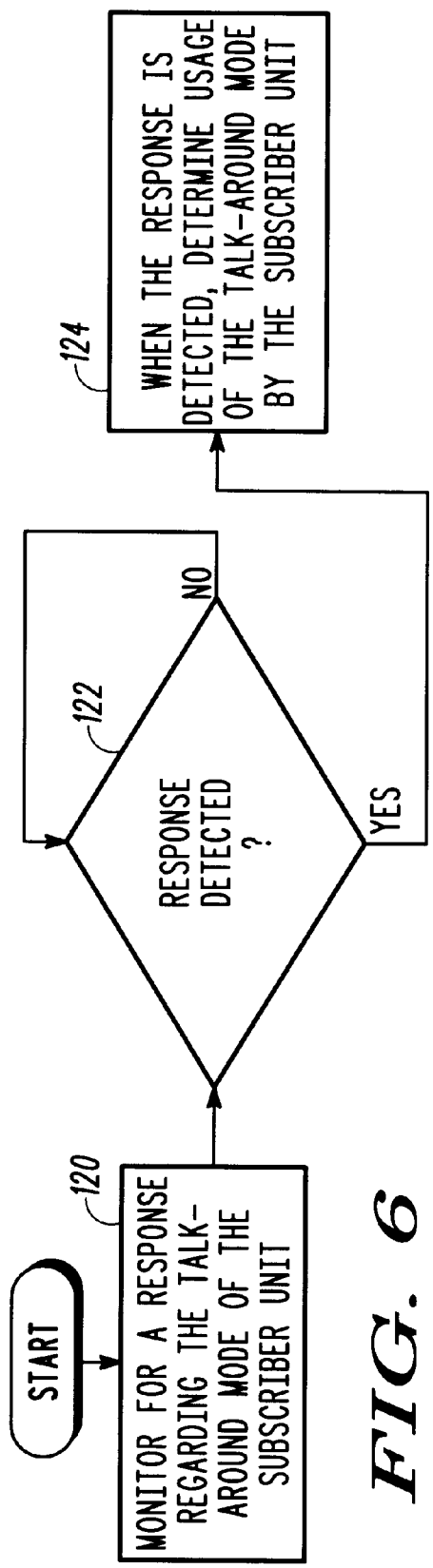

METHOD AND APPARATUS FOR MONITORING SUBSCRIBER TALK-AROUND USAGE

TECHNICAL FIELD OF THE INVENTION

The present invention relates generally to wireless communication systems and more particularly to monitoring use of a talk-around or direct mode.

BACKGROUND OF THE INVENTION

Communication systems are known to include a system controller, a plurality of base station controllers, a plurality of base stations, and a plurality of subscriber units. In operation, the system controller processes communication requests to and from the subscriber units. For a subscriber unit initiated service request, the particular subscriber unit transmits an inbound signaling word over a control channel to a base station. The base station, which is in the same geographic area as the subscriber unit, transmits the request of the subscriber unit to the system controller. The system controller processes the request and determines whether it can be handled locally or whether it needs to be routed to a communication network. If the request can be handled locally, the system controller processes the request by granting the subscriber unit access to a voice or data communication channel. Having been granted access to the communication channel, the subscriber unit performs the requested service, which may be a telephone call to a wireless or wireline telephone, a data packet transmission, call-waiting, or any other type of radio communication service (including group dispatch).

In wireless communication systems, a majority of communications occur over RF (radio frequency) communication channels between the subscriber units and the base stations. Other communications within the wireless communication systems, however, are just between subscriber units, which method of operation is referred to as talk-around or direct mode. In a talk-around mode, the subscriber units communicate directly to each other over a dedicated RF transmission path. Such a talk-around mode is useful in many situations. For example, construction workers at a particular site would use the talk-around mode to communication with each other locally (i.e., without having to communicate through the system). To enter the talk-around mode, each of the construction workers switch their subscriber units into a talk-around mode via a select mode switch or key pad entry.

While the talk-around mode works well for end-users (e.g. the construction workers), service providers of a shared system (i.e., same communication infrastructure is used by subscriber units of the service providers) often don't provide the talk-around mode option because there isn't a mechanism for monitoring usage of the talk-around mode. Without a mechanism for monitoring usage of the talk-around mode, service providers of a shared system have no means for obtaining revenue from subscriber units for their usage of the talk-around option. Therefore, a need exists for a method and apparatus that allows service providers of a shared system to obtain revenue from subscriber units for their usage of talk-around mode by subscriber units.

BRIEF DESCRIPTION OF THE DRAWINGS

FIG. 3 illustrates a flow chart depicting a method for monitoring a subscriber unit's use of a talk-around mode in accordance with the present invention;

FIG. 4 illustrates a flow chart depicting another method for monitoring a subscriber unit's usage of a talk-around mode in accordance with the present invention;

FIG. 5 illustrates a flow chart depicting a method for a subscriber unit to monitor its usage or usage by another subscriber unit of a talk-around mode in accordance with the present invention; and FIG. 6 illustrates a flow chart depicting a method for a monitoring entity to monitor usage of a talk-around mode by a subscriber unit in accordance with the present invention.

DESCRIPTION OF A PREFERRED EMBODIMENT

Generally, the present invention provides a method and apparatus for monitoring a subscriber unit's use of a talk-around mode. This is accomplished by detection of a subscriber unit's selection, and subsequent deselection, of the talk-around mode. Indications of the selection, and subsequent deselection, of the talk-around mode are provided to a monitoring entity. The monitoring entity determines the subscriber unit's usage of the talk-around mode based on the indications. From the usage of the talk-around mode, an appropriate fee for such service can be obtained. Alternatively, the monitoring entity may be provided with usage information, which is used to establish an appropriate fee. With such a method and apparatus, service providers of a shared wireless communication can now offer their subscriber units the option of talk-around and be able to collect the appropriate revenue for the service.

Figure 1:
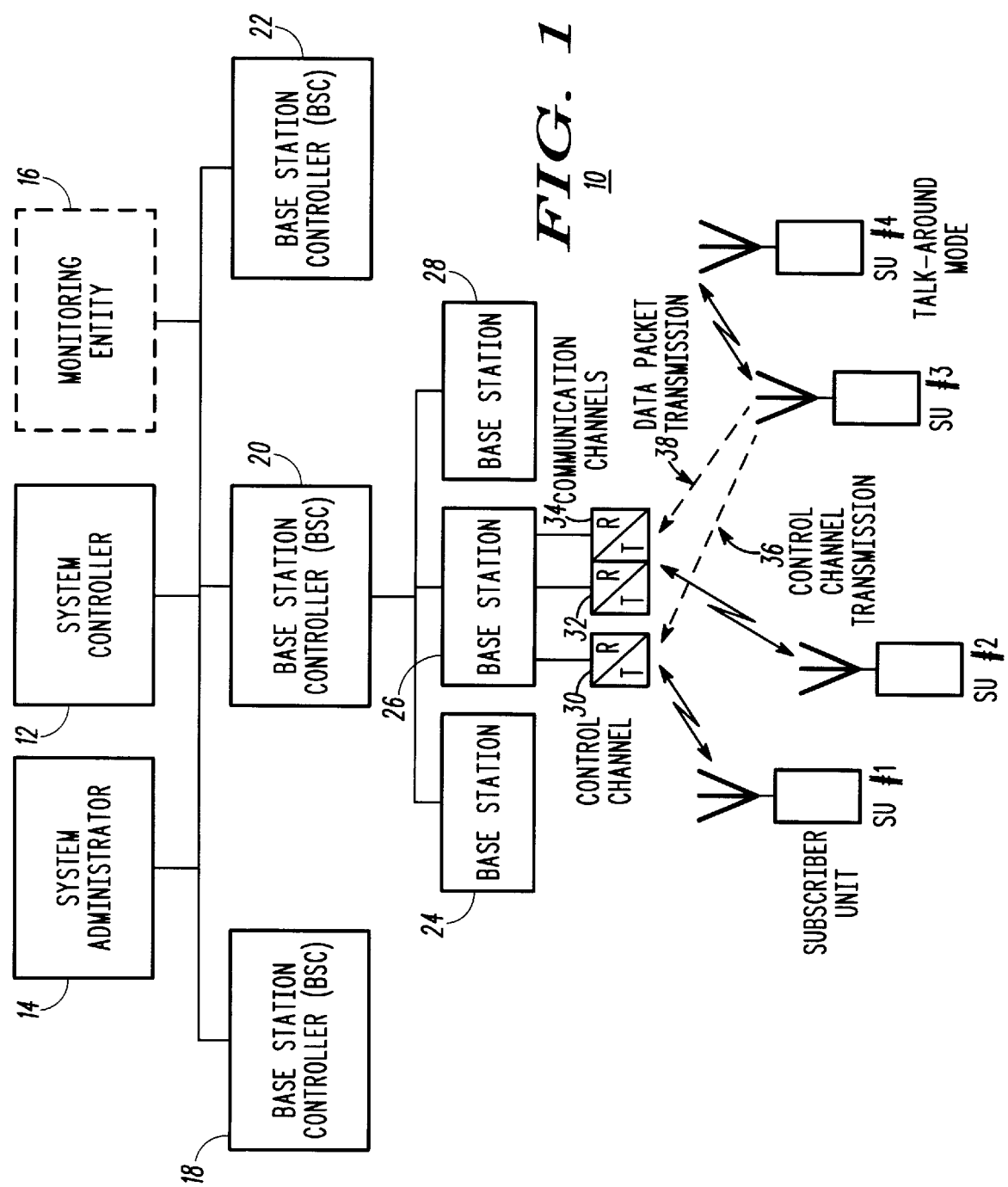
FIG. 1 illustrates a schematic block diagram of a communication system in accordance with the present invention.

The present invention can be more fully described with reference to FIGS. 1 through 6. FIG. 1 illustrates a schematic block diagram of a communication system 10 that includes a system controller 12, a system administrator 14, a monitoring entity 16 (which is optionally a separate device), a plurality of base station controllers 18, 20, 22, a plurality of base stations 24, 26, 28, and a plurality of subscriber units SU 1, SU 2, SU 3, SU 4. The system controller 12 provides control over the operation of the communication system 10 in a particular geographic region. Each of the base station controllers 18, 20 and 22 are located throughout the geographic region and subsections thereof. Each base station controller 18, 20, and 22, has affiliated therewith a plurality of base stations 24, 26 and 28 that are distributed throughout the region. Each of the base stations has affiliated therewith a plurality of communication channels 30, 32, 34. Of the communication channels, one is dedicated as a control channel 30, which is used to communicate operational data between the subscriber units and the base stations.

The system administrator 14, which may be a stand-alone computer, provides system administrative functions to the overall communication system 10. For example, the system administration functions include, but are not limited to, enabling or disabling services that a subscriber unit may access, adding subscriber units to the system, and deleting subscriber units to the system.

The monitoring entity 16 monitors usage of the talk-around mode by subscriber units and calculates the appropriate fees for such usage. The monitoring entity 16 determines the usage of the talk around mode in a variety of ways. One way is for the monitoring entity to receive an indication of a subscriber unit entering the talk-around mode and an indication when the subscriber unit exits the talk-around mode. Based on such indications, the monitoring entity determines the usage. Another way is for the monitoring entity to receive a message that indicates the usage of the talk-around mode by a subscriber unit. The message is received from the subscriber unit, the system administrator, or a second subscriber unit. Note that the monitoring entity 16 may be a stand-alone computer or incorporated in the system administrator 14, another subscriber unit, or the system controller 12.

As shown in FIG. 1, subscriber units SU 3 and SU 4 are in the talk-around mode. In the talk-around mode, subscriber units SU 3 and SU 4 communicate directly over an RF communication path, as opposed to using the communication channels 32, 34 affiliated with the base station 26. To provide an indication that the subscriber units are in a talk-around mode, the subscriber units may do so via a control channel transmission 36 or a data packet transmission 38. Note that subscriber unit SU 3 may provide the indication of the talk-around mode for itself only or for itself and subscriber unit SU 4. Alternatively, subscriber unit SU 4 provides the indication of the talk-around mode for itself, or for itself and subscriber unit SU 3. Further note that other subscriber units may be involved in the talk-around mode wherein each of the subscriber units may in a particular group provide their own indication of the talk-around mode, or one of the subscriber units may be designated as the representative unit providing indications of the talk-around made for the particular group.

Figure 2:
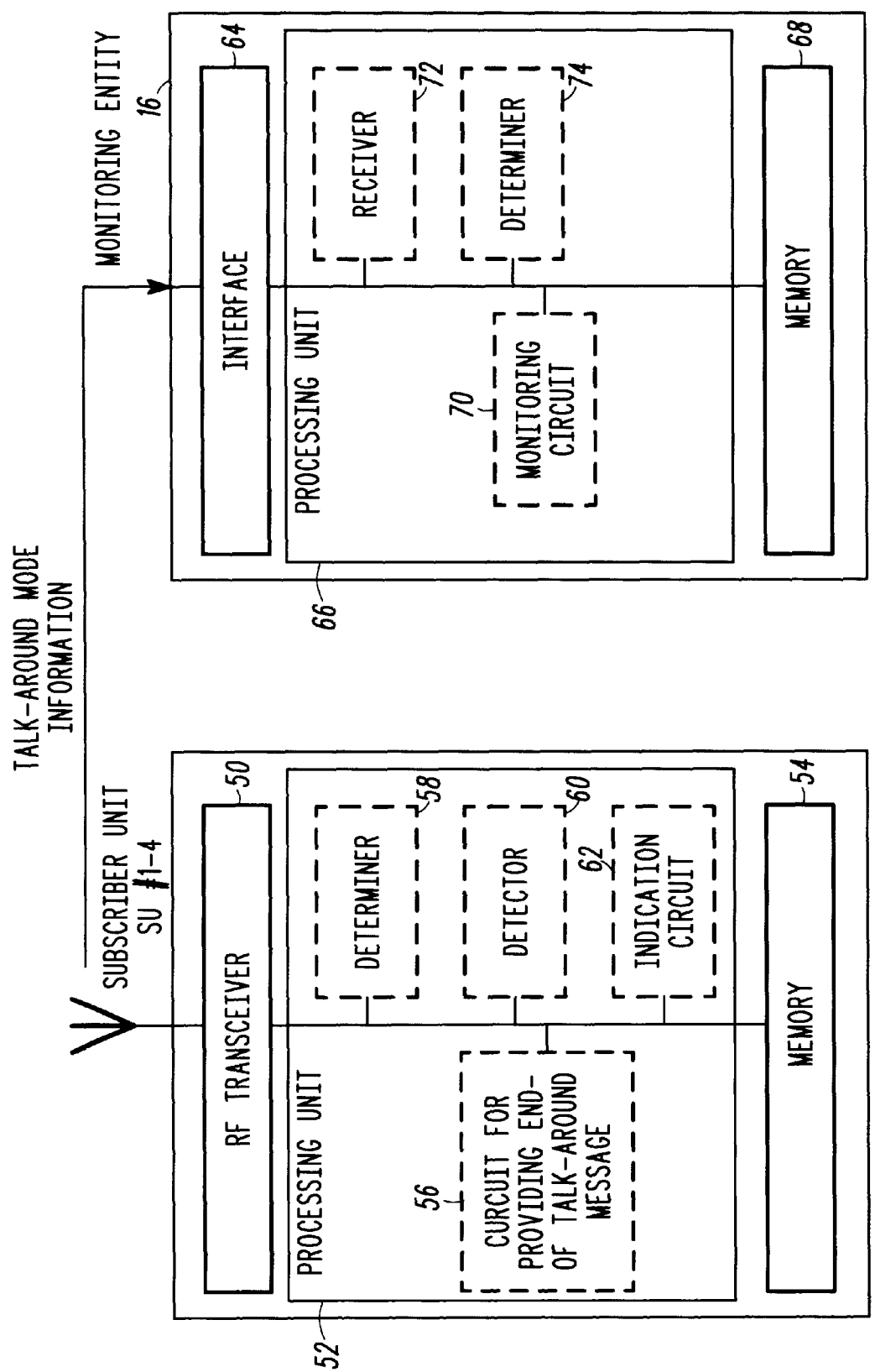
FIG. 2 illustrates a schematic block diagram of a monitoring entity and a subscriber unit in accordance with the present invention.

FIG. 2 illustrates a schematic block diagram of subscriber units SU 1 through SU 4 and the monitoring entity 16. Subscriber units SU 1 through SU 4 include an RF transceiver 50, a processing unit 52, and memory 54. The processing unit 52, which may comprise a microprocessor, micro-controller, digital signal processor, microcomputer, or any other device, or combination of devices, that processes digital information based on programming instructions, operates in accordance with the programming instructions stored in memory 54. The memory 54 may comprise read-only memory (ROM), random access memory (RAM), electronically programmable read-only memory, floppy disk memory, hard disk memory, DVD memory, CD (compact disc) memory, or any other means, or combination of means, for storing digital information.

When executing the programming instructions stored in memory 54, the processing unit 52 functions as a determiner 58, and a detector 60. The processing unit 52, in another embodiment, further functions as a circuit for providing an end of talk-around message 56, and an indication circuit 62. The detector 60 functions to detect when the subscriber unit has entered the talk-around mode, and the determiner 58 determines usage of the talk-around mode. The usage of the talk-around mode is subsequently provided to the monitoring entity.

In the alternative embodiment, the detector 60 detects selection of the talk-around mode. The determiner 58 determines that the subscriber unit is currently using the talk-around mode. The end of talk-around messaging circuit 56 generates a message when the subscriber unit exits the talk-around mode. The indication circuit 62 provides an indication to the monitoring entity 16 that the subscriber unit is in the talk-around mode. A more detailed discussion of the functionality of circuits 56–62 will be discussed with reference to FIGS. 3–5.

The subscriber units SU 1 through SU 4 provide talk-around mode information to the monitoring entity 16. The talk-around mode information includes an indication that the subscriber unit, and possibly other subscriber units, has entered the talk-around mode. Additionally, the talk-around mode information provides an indication that the talk-around mode has ended. Alternatively, the talk-around mode information indicates the duration of use of the talk-around mode, quantity of talk-around transmissions, or elapsed time of active communications. From the talk-around mode information, the monitoring entity 16 determines the usage of the talk-around mode and the appropriate fee to charge the operator of the subscriber units. By monitoring the usage of the talk-around mode in this manner, service providers can obtain revenue for the use of the talk-around mode.

The monitoring entity 16 can be a separate computing device, incorporated in the system controller 12, incorporated in another subscriber unit, or incorporated in the system administrator 14. The monitoring entity 16 includes an interface 64, a processing unit 66, and memory 68. The processing unit 66 may comprise a microprocessor, a micro-controller, a central processing unit, a digital signal processor, a micro-controller, or any other device, or combination of devices, that manipulates digital information based on programming instructions. The memory 68 may comprise read-only memory (ROM), random access memory (RAM), electronically programmable read-only memory, floppy disk memory, hard disk memory, DVD memory, CD memory, or any other means, or combination of means, for storing digital information.

The processing unit 66 operates in accordance with the programming instructions stored in memory 68 to function as a monitoring circuit 70, a receiver 72, and a determiner 74. The receiver 72 receives talk-around mode information pertaining to a subscriber's use of the talk-around mode via the interface 64, which is a radio frequency transceiver or a radio frequency receiver. The monitoring circuit 70 monitors for an indication of usage or data relating to usage, which is included in the talk-around mode information, regarding a subscriber unit's use of the talk-around mode. The determiner 74 determines the amount of usage of the talk-around mode. Once the determiner 74 has determined the usage of the talk-around mode, a fee for such services can be readily obtained. A detailed discussion of the functionality of circuit 70 through 74 will be discussed below with reference to FIGS. 3, 4, and 6.

FIG. 3 illustrates a flow chart depicting a method that is performed by the monitoring entity to monitor usage of the talk-around mode by a subscriber unit. The process begins at step 80 where the selection of the talk-around mode by a subscriber unit is detected. The detection of the talk-around mode is done by the subscriber unit itself, by another subscriber unit that has been designated to serve as a group leader for a group of subscriber units, or by the system administrator. Regardless of which device detects the selection of the talk-around mode, the process proceeds to step 82. At step 82, an indication of the talk-around mode is provided to a monitoring entity. The indication includes the identification code of the subscriber unit and is sent via a control channel transmission or a data packet transmission. When the indication is provided as a data packet transmission, it is done over a communication channel that has been dedicated for data traffic or a voice channel that is sometimes used for data traffic. Note that when the system administrator is detecting the talk-around mode, it detects when the subscriber unit has requested the talk-around mode. Upon making this detection, the system administrator provides the indication to the monitoring entity.

The process then proceeds to step 84 where the monitoring entity, which is one of a stand alone computer device, incorporated in the system administrator, incorporated in the system controller, or incorporated in another subscriber unit, determines usage of the talk-around mode by a subscriber unit. The usage is determined based upon the elapsed time that the subscriber unit was in the talk-around mode (i.e., the time from when the indication of talk-around mode was received until the subscriber unit exits the talk-around mode). The monitoring entity determines that the subscriber unit has exited the talk-around mode by receiving an end of talk-around indication, which is part of the talk-around information, by determining the subscriber unit has requested a nontalk-around service (e.g. a request for a voice channel), or by determining that the subscriber unit is turned-off. The elapsed time is then used to calculate the appropriate fee to charge the owner of the subscriber unit for the talk-around mode. The fee may be based on a fixed price per unit of use, which additionally could vary depending on the time of day of use. For example, if the talk-around mode is used at midnight, the fee would be less than if the talk-around mode were used during the day.

FIG. 4 illustrates a flow chart for an alternate method for monitoring the use of the talk-around mode by a subscriber unit. The process begins at step 90 where a monitoring entity receives an indication of the talk-around mode selection by a subscriber unit. The process then proceeds to step 92 where the subscriber unit monitors its usage of the talk-around mode. Note that step 92 is only performed when the subscriber unit is monitoring its usage and/or another subscriber unit's usage of the talk-around mode. The process next proceeds to step 94 where a determination is made as to whether the monitoring entity received an end of talk-around message from the subscriber unit. If not, the monitoring entity waits until such a message is received.

When the end of talk-around message is received, the process proceeds to step 96 and 98 simultaneously or executed as alternative steps. At step 96, the monitoring entity determines usage of the talk-around mode by the subscriber unit. Such a determination has been previously discussed with reference to FIGS. 2 and 3. At step 98, the subscriber unit provides a message to the monitoring entity regarding its usage of the talk-around mode. Details of how a subscriber unit determines its usage of the talk-around mode will be discussed subsequently with reference to FIG. 5. Note that both steps 96 and 98 would be performed when a redundancy check of the usage is desired.

The process then proceeds to step 100 where the monitoring entity uses messages from the subscriber unit and/or the determined usage of talk-around mode to ascertain an appropriate service fee. The appropriate service fee is obtainable in a variety of ways. For example, the service fee may be a fixed service fee when the talk around mode was initiated during a particular period of time, such that the rates vary depending on the time of day and/or on the day of the week. As another example, the service fee may be a flat fee per unit of use, regardless of the time of day of use. As another example, the service fee may be a flat fee each time the talk-around mode is entered into, regardless of the duration of the use. As one of ordinary skill in the art will readily appreciate, once the usage of the talk-around mode is detected, the appropriate service fee can be obtained in a wide variety of ways.

FIG. 5 illustrates a flow chart depicting a method for a subscriber unit to monitor its usage of the talk-around mode and/or another subscriber unit's usage of the talk-around mode. The process begins at step 110 where the subscriber unit detects its selection of the talk-around mode and/or detects another unit's selection of the talk-around mode. A subscriber unit detects its selection of the talk-around mode via a talk-around mode input device (e.g. keypad, selector switch, etc.), while it detects the selection of the talk-around mode of other subscriber units based on being in the same talk-around communication or receiving control signaling from the other subscriber units. The process then proceeds to step 112 where the subscriber unit monitors its usage of the talk-around mode and/or the usage of another subscriber unit. Such monitoring is done based on an elapsed time of being in the talk-around mode, elapsed time of actual talk-around communications, or a quantity of talk-around transmissions initiated. For example, when the usage is determined based on the elapsed time, the duration from the selection of the talk-around mode to the de-selection of the talk around mode (or selection of another mode) is the usage value. As another example, when the usage is determined based on the elapsed time of talk-around communications, the subscriber unit only stores the amount of time that the parties are actually communicating in the talk-around mode. As yet another example, when the usage is determined on the quantity of the talk-around transmissions, the subscriber unit detects activation of the push-to-talk (PTT) button while in the talk-around mode and quantifies the number of activations of the PTT.

Regardless of how the usage is monitored, the process proceeds to step 114, where the subscriber unit sends an indication of its usage of the talk-around mode and/or the usage of another subscriber unit to the monitoring entity. The indication of usage typically includes an indication that the subscriber unit has exited the talk-around mode, the subscriber unit's identification code, and a usage value. Alternatively, the subscriber unit provides the indication at periodic intervals, wherein the indication indicates that the subscriber unit is still using the talk-around mode and a usage value for the current periodic interval. As another alternative, the subscriber unit would provide the indication when polled by the monitoring entity.

FIG. 6 illustrates a flow chart depicting a method for a monitoring entity to monitor a subscriber unit's usage of a talk-around mode. The process begins at step 120 where the monitoring entity monitors for a response regarding the talk-around mode of a subscriber unit. The response is received by the monitoring entity from the subscriber unit, a designated subscriber unit, or the system administrator. The response includes an indication that the subscriber unit has entered the talk-around mode and exited the talk-around mode, or an indication of a subscriber unit's usage value (e.g. total elapsed time, number of talk-around transmissions, elapsed time of actual talk-around communications). The process proceeds to step 122, where a determination is made as to whether such a response was detected. If not, the process waits until such a response is detected.

Once a response is detected, the process proceeds to step 124. At step 124, the monitoring entity determines the usage of the talk-around mode by the subscriber unit. If the response includes a start of talk-around mode message and an end of talk-around mode message, the monitoring entity determines the usage of the talk-around based on the elapsed time between the starting and ending of the talk-around mode. Note that the starting and ending messages may be time stamped or the monitoring entity may determine the times based on when the messages are received. Alternatively, if the response includes a usage value, the monitoring entity reads the usage value to obtain the subscriber unit's usage of the talk-around mode. Regardless of how the monitoring entity obtains the usage information, it can then calculate an appropriate fee for the use of such services.

The preceding discussion has presented a method and apparatus for monitoring the use of a talk-around mode by subscriber units. The monitoring allows service providers in a shared system to offer a talk-around service and to collect an appropriate revenue for the use of such a service. In previous shared communication systems, service providers either did not offer a talk-around service or would forego the revenue. In most cases, the service providers would not offer the talk-around service. With the present invention, service provides can offer the talk-around service that many customers are demanding and collect revenues for use of the talk-around service.

What is claimed is:

1. A method for monitoring subscriber talk-around usage, the method comprising the steps of:
   detecting selection of talk-around mode for a subscriber unit;
   providing an indication of the selection of the talk-around mode to a monitoring entity; and
   determining, by the monitoring entity, usage of the talk-around mode by the subscriber unit by monitoring at least one of: elapsed time of the usage of the talk-around mode, quantity of transmissions initiated while in the talk-around mode, and time of day of the usage of the talk-around mode.

2. The method of claim 1 further comprising detecting selection of the talk-around mode by at least one of: the subscriber unit, a system administrator, and a second subscriber unit.

3. The method of claim 1 further comprising providing the indication via at least one of: a control channel transmission and a data packet transmission.

4. The method of claim 1 further comprising providing identity of the subscriber unit as at least part of the indication.

5. The method of claim 1 further comprising determining, by the subscriber unit, the usage of the talk-around mode and providing a message to the monitoring entity regarding the usage of the talk-around mode as determined by the subscriber unit.

6. The method of claim 1 further comprising determining the usage of the talk-around mode by at least one of: a system controller, a system administrator, and a second subscriber unit.

7. The method of claim 1 further comprising providing, by the subscriber unit, an end-of-talk-around message to the monitoring entity and utilizing, by the monitoring entity, the end-of-talk-around message to determine the usage of the talk-around mode.

8. The method of claim 1 further comprising allocating a fixed service fee for the usage of the talk-around mode when the indication was received by the monitoring entity within a period of time.

9. A method for monitoring subscriber talk-around usage, the method comprising the steps of:
   detecting selection of talk-around mode by a subscriber unit;
   monitoring, by the subscriber unit, usage of the talk-around mode by the subscriber unit; by monitoring at least one of: elapsed time of the usage of the talk-around mode, quantity of transmissions initiated while in the talk-around mode, and time of day of the usage of the talk-around mode; and
   sending an indication of the usage of the talk-around mode to a monitoring entity.

10. The method of claim 9 further comprising sending the indication when at least one of: exiting the talk-around mode, at intervals during the usage of the talk-around mode, and requested by the monitoring entity, has occurred.

11. The method of claim 9 further comprising sending the indication to at least one of: a system controller, a system administrator, and a second subscriber unit.

12. The method of claim 9 further comprising, determining the usage of the talk-around mode based on at least one: elapsed time of the usage of the talk-around mode, quantity of transmissions initiated while in the talk-around mode, and time of day of the usage of the talk-around mode.

13. The method of claim 9 further comprising monitoring, by the subscriber unit, the usage of the talk-around mode by a group of subscriber units.

14. A method for determining usage of talk-around mode by a subscriber unit, the method comprising the steps of:
   monitoring for a response regarding the talk-around mode of the subscriber unit; and
   when the response is detected, determining usage of the talk-around mode by the subscriber unit based on an elapsed time of the usage of the talk-around mode.

15. The method of claim 14 further comprising receiving the response from at least one of: the subscriber unit, a second subscriber unit, and a system administrator.

16. The method of claim 14 further comprising, receiving, as the response, at least one of: a start and end-of-talk-around messages and information regarding the usage of the talk-around mode.

17. A subscriber unit operable in a talk-around mode, the subscriber unit comprising:
   a radio frequency transceiver that transceives talk-around mode information with a monitoring entity;
   a processing unit operably coupled to the radio frequency transceiver; and
   a memory operably coupled to the processing unit, the memory storing programming instructions executable by the processing unit, the processing unit being operable, upon execution of the programming instructions, to determine usage of the talk-around mode by the subscriber unit by monitoring at least one of: elapsed time of the usage of the talk-around mode and time of day of the usage of the talk-around mode.

18. A monitoring entity for monitoring a subscriber unit's usage of a talk-around mode, the monitoring entity comprising:
   a processing unit adapted to receive talk-around mode information from a subscriber unit; and
   a memory operably coupled to the processing unit, the memory storing programming instructions executable by the processing unit in response to the processor receiving the talk-around information from the subscriber unit, the processing unit being operable, upon execution of the programming instructions, to determine an elapsed time of usage of the talk-around mode by the subscriber unit.

19. The monitoring entity of claim 18 wherein the processing unit is not another subscriber unit.

* * * * *